(12) United States Patent
Baumeister et al.

(10) Patent No.: US 6,792,426 B2
(45) Date of Patent: Sep. 14, 2004

(54) GENERIC SERVLET FOR BROWSING EJB ENTITY BEANS

(75) Inventors: Sascha Baumeister, Stuttgart (DE); Gerd Breiter, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 10/041,415

(22) Filed: Jan. 8, 2002

(65) Prior Publication Data

US 2002/0091837 A1 Jul. 11, 2002

(30) Foreign Application Priority Data

Jan. 10, 2001 (EP) ............................................ 01100566

(51) Int. Cl.[7] .............................................. G06F 17/30
(52) U.S. Cl. ...................................... 707/10; 707/104.1
(58) Field of Search ....................... 707/10, 102, 104.1, 707/204; 345/619; 713/100; 717/107, 126, 166; 719/315

(56) References Cited

U.S. PATENT DOCUMENTS

| | | | | |
|---|---|---|---|---|
| 6,237,135 | B1 * | 5/2001 | Timbol | 717/107 |
| 6,557,100 | B1 * | 4/2003 | Knutson | 713/100 |
| 6,684,387 | B1 * | 1/2004 | Acker et al. | 717/126 |
| 6,704,805 | B1 * | 3/2004 | Acker et al. | 719/315 |

OTHER PUBLICATIONS

Ying Zou et al., Web–Based Specification and Integration of Legacy Services, Dept. of Electrical & Computer Engineering, University of Waterloo, pp. 1–15.*

* cited by examiner

*Primary Examiner*—Diane D. Mizrahi
*Assistant Examiner*—Apu M Mofiz
(74) *Attorney, Agent, or Firm*—William A. Kinnaman, Jr.

(57) ABSTRACT

For browsing entity beans in a client-server environment using the Enterprise Java Beans (EJB) architecture a generic servlet is provided for receiving a service requests from a Web browser and for initiating an access to an entity bean directory to identify an entity bean home according to a bean name contained in the request. The identified entity bean home is asked for a specific entity bean instance using key information passed with the service request. The identified bean instance is introspected by using getBeanInfo( ) methods of the Java Bean Introspector. The information achieved by the introspection is used for retrieving entity bean properties from an EJB persistency store. On the basis of the retrieved information the generic servlet generates a response which provides a representation of the retrieved information. The generic servlet allows to avoid the development of customized servlets which comprise specific code for the browsing and editing of different entity bean classes.

24 Claims, 4 Drawing Sheets

GENERIC SERVLET FOR BROWSING EJB ENTITY BEANS

BACKGROUND OF THE INVENTION

1. Field of the Invention

The invention relates to a method for browsing EJB entity beans by means of a Java servlet which is invoked by a service request from a browser including the name of an entity bean type and an entity bean key. The invention also relates to a corresponding apparatus and program product.

2. Description of the Related Art

In programming of Web applications the Java programming language is broadly employed. Such applications are distributed to the Web server site and to the customer client site. A preferred architectural approach in developing Web server applications is the use of the Java Servlet Architecture (Goodwill, 'Developing JAVA Servlets', Sams Publishing—SAMS/Macmillan Computer Publishing, Indianapolis, USA, 1999). A Java servlet is a dynamically loaded program module that extends the functionality of a server and receives requests from a client, performs processing steps to generate a response, possibly by querying databases, and sends the response to the client where the response may include an HTML or XML document. A Java servlet is object oriented and contains service methods according to the service functions of the servlet. A service method receives a servlet request object and a servlet response object. The servlet request object holds the information that the client provides to the servlet and the servlet response indicates where to place the data which has to be sent back to the client.

There exist two classes of servlets: generic servlets and HTTP specific servlets where the latter are an extension from GenericServlet. These classes implement the framework for all servlets which includes the init( ) method that initializes a servlet, the service( ) method that receives client requests and responds to them, and the destroy( ) method that performs cleanup.

Another technology available in the Java language is the Java Bean Architecture. Java beans are reusable software components that include a serializable interface and public get/set methods. A Java bean is characterized by the properties, events and methods which it contains and which it may export. Java beans may be used to support the development of applications.

The Java Bean Architecture comprises the Enterprise Java Bean Architecture which is a server-oriented technology for developing and deploying components containing business and transaction logic for enterprise applications ('Designing Enterprise Applications with the JAVA 2 Platform, Enterprise Edition', Version 1.0, Sun Microsystems, Inc., Palo Alto, USA, March 2000). The Enterprise Java Beans (EJB) architecture applies the Java Beans concept to distributed business objects and provides a framework for extending the services provided by the Java beans technology with persistency, life cycle support, transactional behavior, remote services, etc. The EJB architecture comprises two types of enterprise beans: session beans and entity beans. A session bean provides services on behalf of a client and usually exists only for the duration of a single client-server session. An entity bean is a persistent object that represents data stored in a database or other persistent storage as long as that data is in existence. Each entity bean is identified by a primary key which can be used by a plurality of clients for finding the entity bean to retrieve its current content. For example, the primary key of an entity bean that represents a bank account may be the account number. The primary class key of this example is BankAccountKey, comprised of a property "number".

In servlet-based Web applications there is currently no way to browse business objects represented by EJB entity beans in a generic way. This means that if someone wants to display the contents of entity beans, a customized servlet has to be developed that has to contain specific code for every entity bean class being accessed. A generic solution which can avoid the development of such specific code would have the advantage that a single reusable servlet can be used to browse through all kinds of entity beans.

SUMMARY OF THE INVENTION

It is an object of the invention to provide a possibility to browse business objects represented by EJB entity beans in a generic way.

In particular, it is an object of the invention to introduce a generic servlet that is able to browse all kinds of EJB entity beans.

It is a further object of the invention to use only one type of servlet to browse an a priori unknown set of entity beans.

According to the invention, as defined in the claims, a Java servlet initiates an EJB server to perform an access to a bean directory by using the parameters included in the service request from a client application. An EJB entity bean home is identified in the directory service of the Java Naming and Directory Interface (JNDI) by using the name of an entity bean type included in the service request, and an entity instance is found in the identified bean home according to the entity bean key also derivable in the service request. By means of the Java Bean Introspector the entity bean instance is introspected to retrieve information from the entity bean including the properties and description of the entity bean. The servlet generates a service response containing a representation according to the retrieved information.

It is one aspect of the invention that the Java servlet is a generic servlet which is used for different client applications and irrespectively of type and format of the bean information to be retrieved.

The invention allows one to avoid the development of customized applications or servlets which comprise specific code for the browsing and editing of different entity bean classes. Instead a single reusable servlet can be used to browse through all kinds of entity beans.

BRIEF DESCRIPTION OF THE DRAWINGS

In the following an implementation of the invention is described with reference to drawings which show.

DESCRIPTION OF THE PREFERRED EMBODIMENTS

Figure 1:
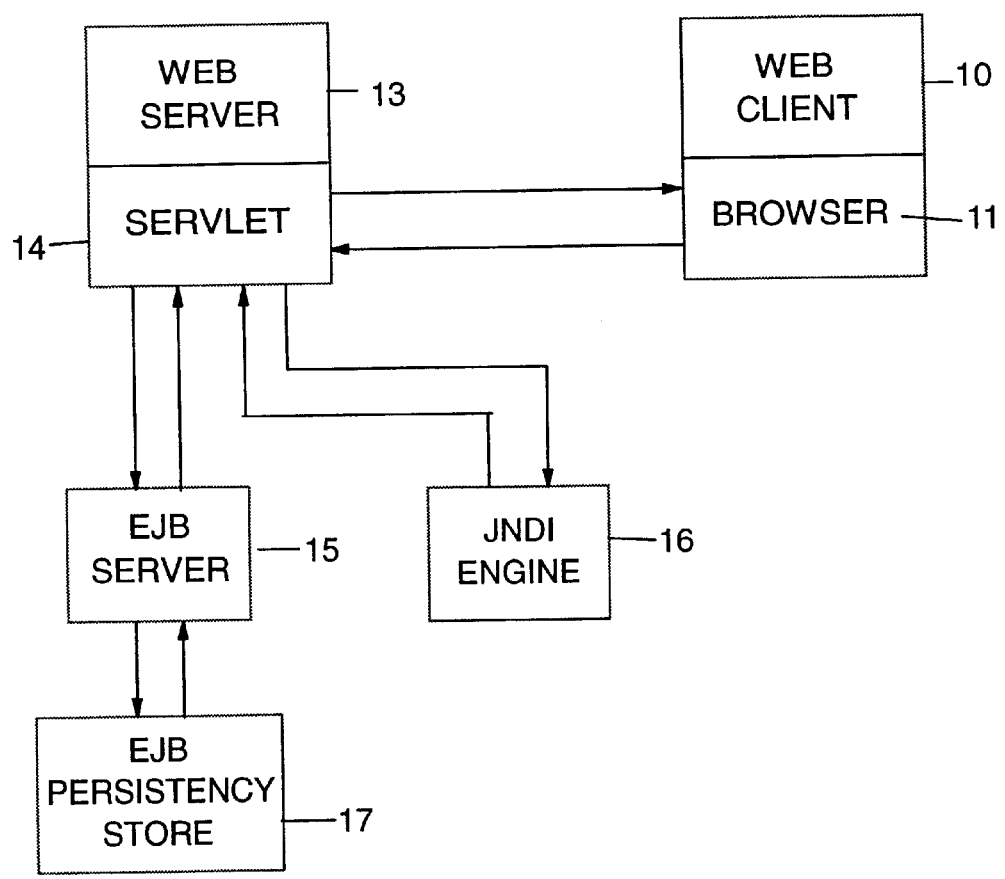
FIG. 1 is a block diagram of the Web environment wherein the invention is used.

The invention is applied to a Web environment comprising a plurality of client computers 10 and at least one Web server computer 13. Each client computer 10, of which only one is shown in FIG. 1, runs a Web browser 11. The Web server 13 operates as a Java Enterprise server using the Java servlet architecture. The Web server is supported by an Enterprise Java Bean server 15. For this purpose the Web server 13 cooperates with the Enterprise Java Bean server 15 by applying the Remote Method Invocation (RMI) concept.

The Web 13 server comprises a generic servlet 14 which receives a servlet request from the Web browser 11 and sends a request for an entity bean home to a JNDI engine 16. The request includes search parameters to get from the JNDI engine 16 information on Entity Bean Home. This information is used by the EJB server 15 for accessing the content of the corresponding entity bean in an EJB persistency store 17 which handles EJB entity beans over their lifetime. An EJB entity bean may contain the bank account data of a bank customer and may be stored as a member of the EJB bean type "Account" in an account database of the bank.

For the Java Enterprise architecture, EJB entity beans and the Java Naming and Directory Interface (JNDI) reference is made to the book "Java Enterprise in a Nutshell" by D. Flanagan et al, published by O'Reilly & Associates, Sebastopol, Calif., USA, 1999, pages 114, 143, 174.

The Web browser 11 of the Web client 10 may send via the Web a request for account data of a customer to generate a display of that data on a screen of the client computer. Such request may have the format:
http://ServerName/Servlet/ClientBrowserServlet?
   class=Account accountNumber=4333.

This request invokes the browser servlet 14 in the server 13 to perform an access to the EJB home "Account" for retrieving the EJB entity bean object which contains the account data of the account having the customer account number "4333". The servlet 14 sends a related response via the Web to the browser 11 in the client 10. The response submitted to the browser is represented by an HTML page containing the requested data of the customer account having the account number "4333". This data is retrieved from the EJB persistency store 17 by means of the Address home received through accessing the bean directory in the JNDI engine 16, and finding the EJB entity bean instance using the key "4333" in the home.

If this example is performed by prior art systems, the request invokes a specific servlet which has to be customized to contain specific code for the entity bean class being accessed for browsing and displaying account data. The invention avoids such specific servlets and uses instead a generic and reusable servlet which can be applied to all kinds of entity beans.

The information contained in a bean includes properties, events and methods. This information indicate the type of the bean and the format in which this information is obtained. For example, the information contained in beans of an entity bean "Product" may be a product number, the name of a product type, the price of a product, its stock, etc. The format of the information may be byte, string, floating point number, integer, text etc.

The introspector, a class that offers a static getBeaninfo( ) method which is part of the JAVA Beans Package, allows to obtain information about Java Beans irrespective of the type, coding or format of that information. The getbeaninfo( ) method is usually invoked only by application builders or similar tools to retrieve a Beaninfo class for a specified bean class. For a class named "Product", it looks for a Beaninfo class named ProductBeanInfo, first in the current package and then in each of the packages of the BeanInfo search path. The information obtained by the introspector comprises the bean properties, events and methods contained in a bean. If introspection does not reveal a Beaninfo, or if the Beaninfo class found does not provide complete information about the bean properties, events and methods, the introspection is extended by using the Java.lang.reflect package to generate the missing information. The information contained in a bean may consist of one or more other beans which can then be successively introspected. Reference is also made to the book "Java in a Nutshell" by D. Flanagan, published by O'Reilly & Associates, Sebastopol, Calif., USA, Third Edition, 2000, pages 254, 255.

Figure 2:
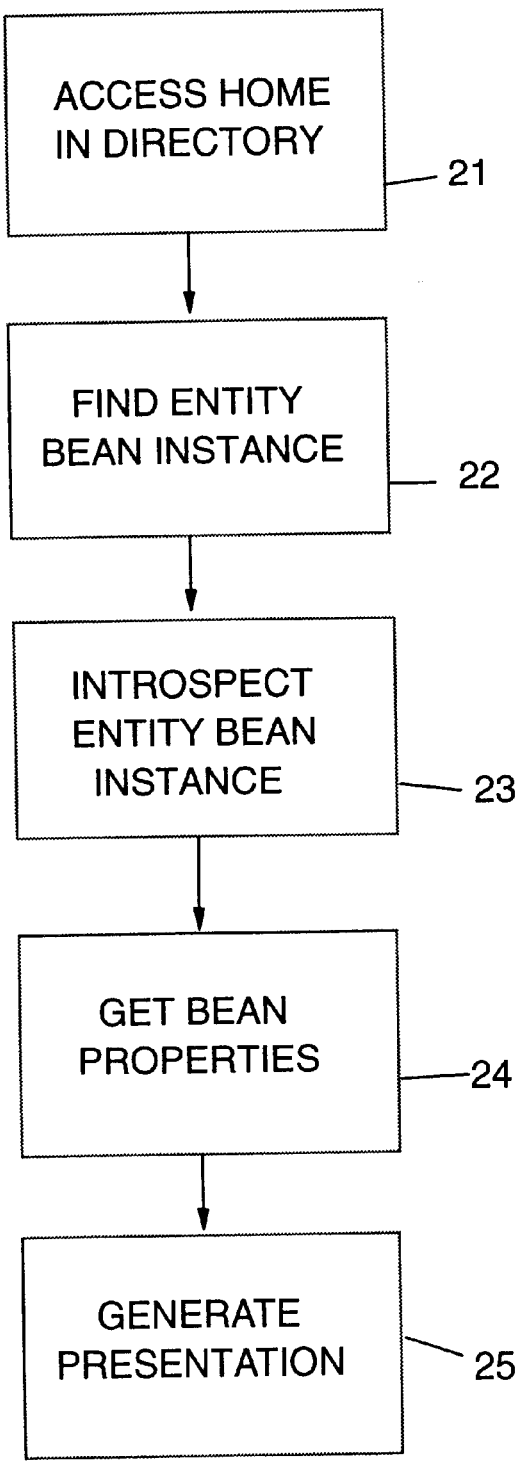
FIG. 2 is a schematic flow diagram of a method which represents an implementation of the invention.

FIG. 2 shows an implementation of a method according to the invention by means of a schematic flow diagram which show the steps performed in the generic servlet 14 in the JNDI engine 16 after a request has been received from the browser 11.

By step 21 the directory is accessed to identify the bean home using the EJB name specified by the HTTP request which is issued by the browser 11. Step 22 finds an entity bean instance in the EJB persistency store 17 by accessing the entity bean home and passing the key information received with request. In step 22 the introspection mechanism is applied to the entity bean instance found, and step 24 uses the getbeanInfo( ) method of the introspector class to get the bean properties and their values by accessing the EJB persistency store 17. By the steps 23 and 24 the information contained in the bean is revealed irrespectively of the type of the bean and format of the information. This implies that the generic servlet 14 can be used to browse a set of entity beans the information on type and format of which is a priori unknown. Step 25 generates a presentation of the properties obtained by the steps 23 and 24.

Figure 3:
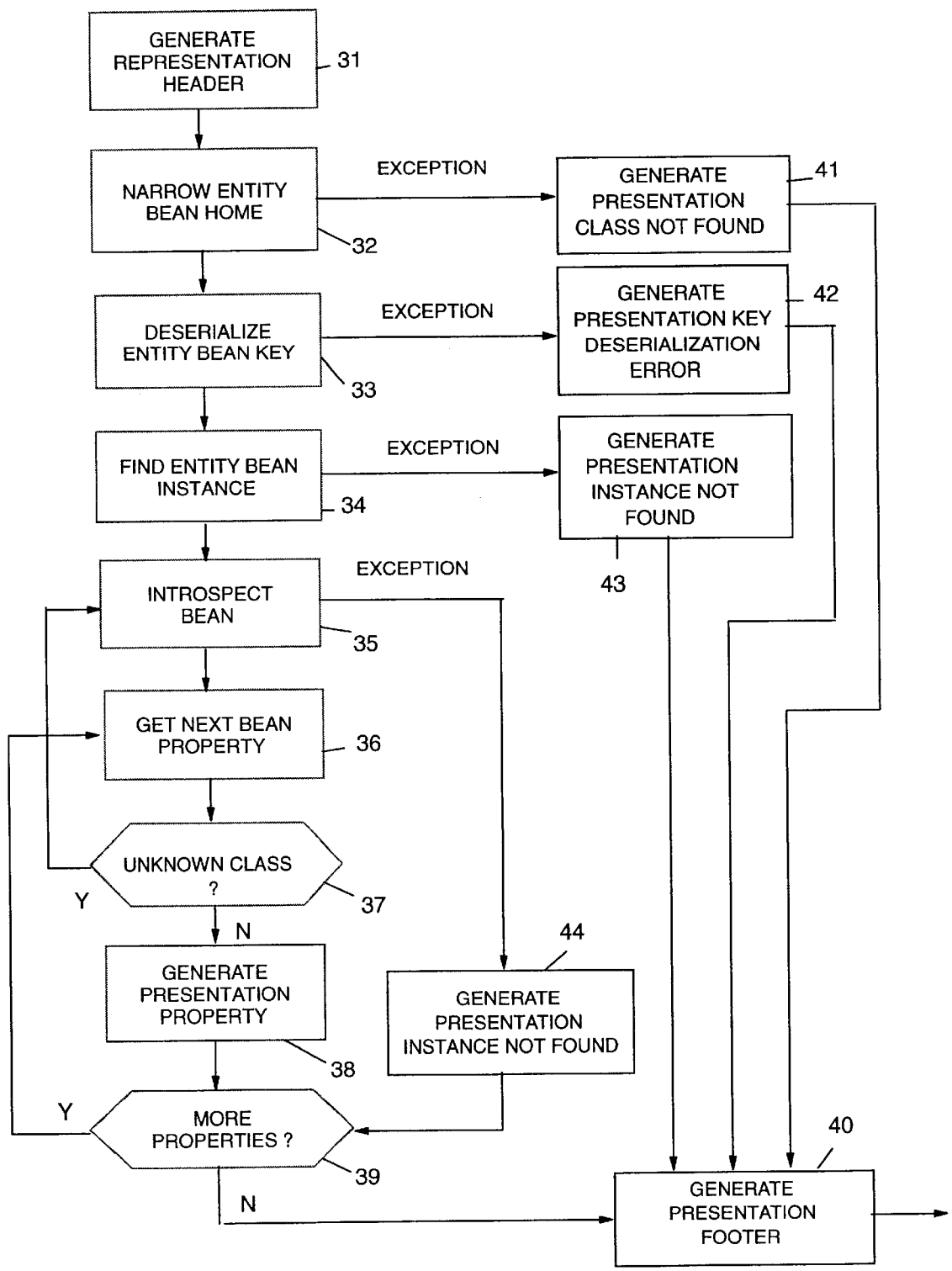
FIG. 3 is a more detailed flow diagram of the method according to FIG. 2.

FIG. 3 shows a more detailed flow diagram of the method according to the invention. The servlet 14 used to perform the method may be a HTTP servlet. It generates a representation of EJB entity beans on a screen in response to the operation of a Web browser which runs on the computer 10 of a client.

In step 31 the servlet 14 generates a header representation as a static output which precedes the dynamic output provided by the entity beans to be called. Step 32 operates on the directory in the JNDI engine 16 by accessing the directory with the entity bean type name included in the request. The entity bean type is an entity beans class the name of which, represented as a string, is used to narrow the home of the entity bean class in the directory. The result of this step is called EntityBeanHome.

In step 33 the entity bean key representation passed with the HTTP request is deserialized. The serialized string representation of the entity Bean Key is deserialized into a key object. This preferably takes place in two partial steps: first, the string has to be decoded into a byte array, then the byte array has to be deserialized, by using the standard Java object deserialization. The result of step 33 is the EntityBeanKeyInstance. In step 34 the Entity Bean Home found in step 32 is used to find an Entity Bean instance that matches the EntityBeanKeyInstance. Step 35 introspects the EntityBeanInstance. Java Bean Introspection is used to obtain information about EntityBeanInstance and to determine its properties. The result of this step is called BeanInfoInstance.

Step 36 performs the function: Get Next Bean Property and Descriptor. This step fetches the next bean property value from the Entity Bean instance. If no property was considered before, the step treats the first property indicated by BeanInfoInstance. Step 36 iterates over the properties accessible through BeanInfoInstance by repeatedly accessing the persistency store 17. The determined property will further be referred to as ActualProperty and the determined property value will be referred as ActualPropertyValue.

In step 37 it will be checked whether the property value fetched belongs to a base type or is well known or whether it is a prior unknown class. The decision is made by determining the type of ActualProperty. If the property is of an unknown class, step 35 is performed on it recursively to break the property down into base types or well known classes. In step 38 the property of the determined property is represented. This step generates a text representation of the ActualProperty and the ActualPropertyValue and writes them into the servlet response. The form of the representation depends on the implementation of the servlet and possible system management parameters. A suitable form of representation could be the following:

<ActualProperty name>=<string representation of Actual-PropertyValue>.

Step 39 has to determine whether there exist any more properties in the BeanInfo which require to be processed. If there are more properties, step 36 is repeated on the next property. If there are no more properties, step 60 generates the representation of the footer as a static output which is included in the representation on the screen and appends to the dynamic content. Step 40 can be used for footer definition, for the inclusion of links to other pages or similar operations.

Step 41 is performed when no home is found in step 32. Step 41 generates the entity bean representation in the case where the narrowing of the entity beans home was not successful. A suitable representation in this case is a message that an EJB with the given Entity Bean Name was not found. Step 41 is followed by step 40 to generate the footer.

Step 42 indicates a key deserialization error. This step generates the entity bean representation in the case where the deserialization of the entity bean key was not successful. A suitable representation in this case is a message that the key is either missing or was encoded in an improper way. Step 42 is followed by step 40 to generate the footer.

Step 43 indicates that a bean instance was not found. This step generates the entity bean representation in the case where no entity bean instance was found with the entity bean key. A suitable representation in this case is a message that by using the EntityBeanKey no instance was found in the EntityBeanHome. Step 43 is followed by step 40 to generate the footer.

Step 44 indicates an introspection error. This step generates the entity bean representation in the case where the introspection of the bean failed. A suitable representation for such situation is a message that the bean was not introspectable. In case that the bean is the property of another bean, the name of that property can be displayed. Step 44 is followed by step 39 to check whether there are more properties to be introspected.

The method steps described by reference to FIGS. 2 and 3 may be implemented in a program product which is stored and distributed on a machine readable carrier or transmitted through a digital data network such as the Internet.

Figure 4:
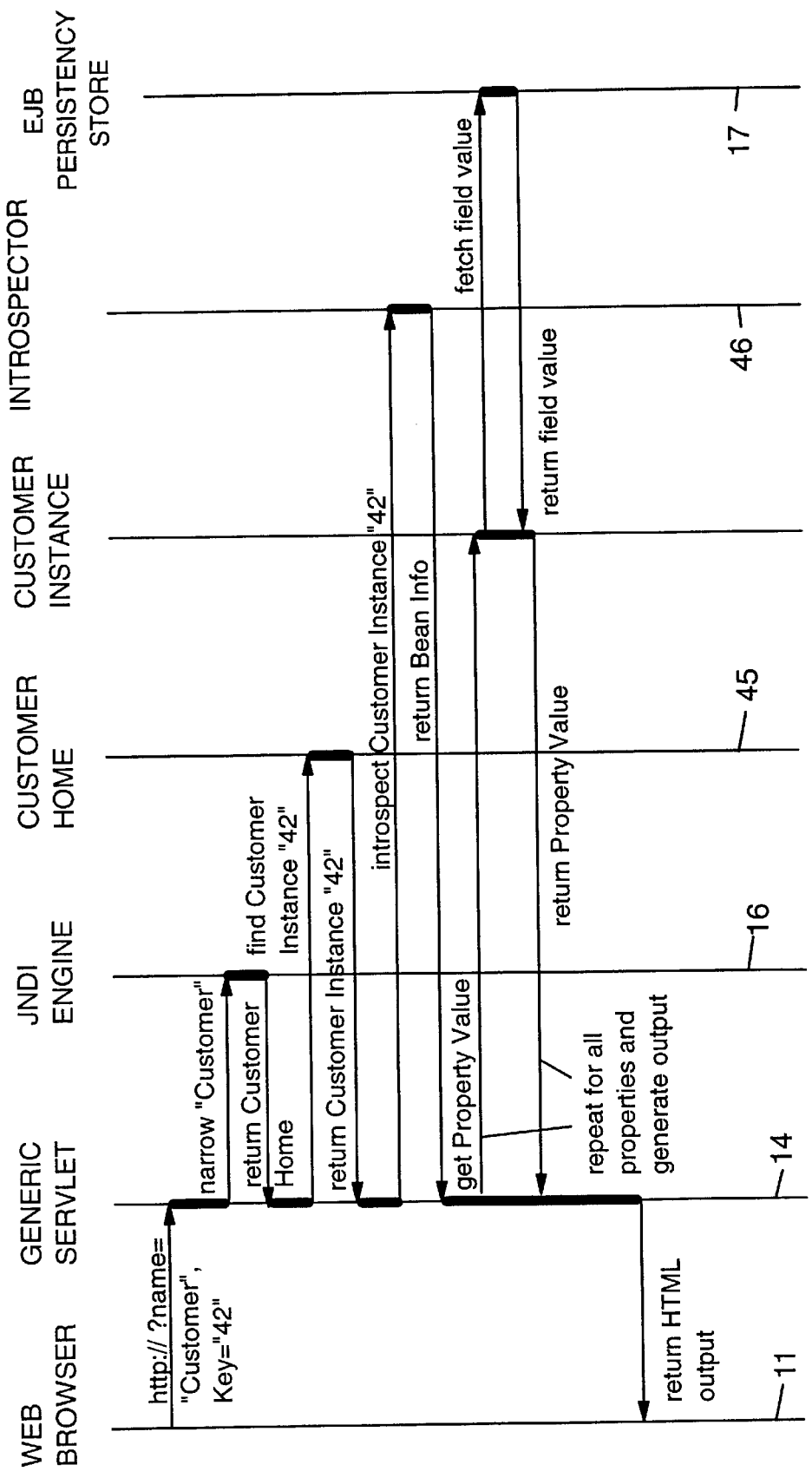
FIG. 4 is a UML diagram of the operation phases of browsing an entity bean example.

FIG. 4 is a diagram representation in the Unified Modelling Language (UML) which shows the involvement of system components in performing the operation phases according to the invention with regard to an example. The example relates to a customer entity bean consisting of an identity=42 (int), the name "Johnson" (string), and address (Address) which address as a simple Java bean consisting of street="Broadway" (string) and number="1234" and may be represented as follows:

Customer: 42
  name=Johnson
  Address=
    Street=Broadway
    Number=1234

The HTTP request received by the generic servlet 14 from the Web browser 11 contains "Customer" as home name and 42 as instance key. The home name is used to narrow down the home of the EJB entity bean type "Customer". This operation is performed by calling a corresponding service of the JNDI engine 16. By means of the key the customer home 45 is inspected to find the customer instance 42 and return it to the generic servlet 14. The servlet then activates the Java bean introspector 46 in the EJB server 15 to introspect the "Customer" instance 42. The bean information identified by the bean introspection is returned to the generic servlet and used to get the bean property value. For this purpose, the corresponding field value is fetched from the persistency store 17. In the example, the field value is the string "Johnson". The field value is returned as property value to the generic servlet. In case that there are more properties indicated by the introspector, such as the property "address", the operations to get the property value, fetch the field value, return the field value and return the property value to the servlet are repeated correspondingly as also shown by the steps 39 and 36 in FIG. 3.

In FIG. 4 the deserialization of the key and the recursive introspection of unknown property classes are not shown to reduce complexity.

While the invention is described with reference to preferred embodiments of the invention, modifications or other implementations are within the scope of the invention as defined in the claims.

What is claimed is:

1. A method for browsing EJB entity beans by means of a Java servlet which is invoked by a service request from a browser including a name of an entity bean type and an entity bean key, the method using an EJB server and a persistency store for storing entity bean properties, the method comprising the steps of:

identifying a bean home in a directory by using the name of an entity bean type;

finding an entity bean instance in the identified bean home according to the entity bean key;

introspecting the entity bean instance found and retrieving properties of the entity bean instance from the persistency store by using information received from introspection; and generating a service response object containing a representation according to the retrieved information.

2. The method of claim 1, wherein the entity bean instance found is introspected by using a Java Bean Introspection function.

3. The method of claim 1, wherein the Java servlet is a generic servlet which is used for different client applications and irrespectively of type and format of bean information to be retrieved.

4. The method of claim 1, wherein identification of an entity bean name is performed by calling a directory service of a Java Naming and Directory Interface (JNDI).

5. The method of claim 1, further comprising the step of deserializing the entity bean key provided by the service request.

6. The method of step 5, wherein the entity bean key provided by the service request is deserialized by using standard Java deserialization technology.

7. The method of claim 1, further comprising the steps of determining whether the retrieving step results in a property which belongs to an unknown class and repeating the introspecting step if the property belongs to an unknown class.

8. The method of claim 1, further comprising the steps of determining whether more properties exist after completion of the generating step and repeating the retrieving step if more properties exist.

9. The method of claim 1, further comprising the step of providing header and footer representations to the representation according to the retrieved information.

10. An apparatus for browsing EJB entity beans by means of a Java servlet which is invoked by a service request from a browser including a name of an entity bean type and an entity bean key, having an EJB server and a persistency store for storing entity bean properties, the apparatus comprising:

means for identifying a bean home in a directory by using the name of an entity bean type;
   means for finding an entity bean instance in the identified bean home according to an entity bean key;
   means for introspecting the entity bean instance found and for retrieving properties of the entity bean instance from the persistency store by using information received through introspection; and
   means for generating a service response containing a representation according to the retrieved properties.

11. The apparatus of claim 10, wherein the entity bean instance found is introspected by using a Java Bean Introspection function.

12. The apparatus of claim 10, comprising generic servlet means for receiving service requests originated by different client applications, for initiating operation of the identifying, finding and introspecting means, and for receiving the information retrieved from the persistency store and for sending a response to requesting browser.

13. The apparatus of claim 10, further comprising means for deserializing the entity bean key provided by the service request.

14. The apparatus of claim 10, further comprising means for determining whether the retrieving means provides a property which belongs to an unknown class and for initiating a repeated operation of the introspecting means if the property belongs to an unknown class.

15. The apparatus of claim 10, further comprising means for determining whether more properties exist after the generating means has completed generating a representation and for repeating the operation of the retrieving means if more properties exist.

16. The apparatus of claim 10, further comprising means for providing header and footer representations to the representation according to the retrieved information.

17. A program product stored on a machine readable data carrier for browsing EJB entity beans by means of a Java servlet which is invoked by a service request from a browser including a name of an entity bean type and an entity bean key, the method using an EJB server and a persistency store for storing entity bean properties, comprising the steps of:

identifying a bean home in a directory by using the name of an entity bean type;
   finding an entity bean instance in the identified bean home according to the entity bean key;
   introspecting the entity bean instance found and retrieving properties of the entity bean from the persistency store by using information received from introspection; and
   generating a service response object containing a representation according to the retrieved information.

18. The program product of claim 17, wherein the entity bean instance found is introspected by using a Java Bean Introspection function.

19. The program product of claim 17, wherein the Java servlet is a generic servlet which is used for different client applications and irrespectively of type and format of bean information to be retrieved.

20. The program product of claim 17 wherein identification of an entity bean name is performed by calling a directory service of a Java Naming and Directory Interface (JNDI).

21. The program product of claim 17, further comprising the step of deserializing the entity bean key provided by the service request.

22. The program product of claim 17, further comprising the steps of determining whether the retrieving step results in a property which belongs to an unknown class and repeating the introspecting step if the property belongs to an unknown class.

23. The program product of claim 17, further comprising the steps of determining whether more properties exist after completion of the generating step and repeating the retrieving step if more properties exist.

24. The program product of claim 17, further comprising the step of providing header and footer representations to the representation according to the retrieved information.

* * * * *